United States Patent
Oten et al.

(10) Patent No.: US 7,564,489 B1
(45) Date of Patent: Jul. 21, 2009

(54) METHOD FOR REDUCING ROW NOISE WITH DARK PIXEL DATA

(75) Inventors: Remzi Oten, Santa Clara, CA (US); Jim Li, San Jose, CA (US)

(73) Assignee: Crosstek Capital, LLC, Wilmington, DE (US)

( * ) Notice: Subject to any disclaimer, the term of this patent is extended or adjusted under 35 U.S.C. 154(b) by 723 days.

(21) Appl. No.: 11/060,856

(22) Filed: Feb. 18, 2005

(51) Int. Cl.
  *H04N 5/217* (2006.01)
  *H04N 1/38* (2006.01)
(52) U.S. Cl. ...................... 348/241; 358/463
(58) Field of Classification Search ................. 348/241, 348/243, 245, 246, 251, 615; 358/463
  See application file for complete search history.

(56) References Cited

U.S. PATENT DOCUMENTS

| | | | | |
|---|---|---|---|---|
| 5,654,755 A | * | 8/1997 | Hosier | 348/245 |
| 6,130,712 A | * | 10/2000 | Miyazaki et al. | 348/245 |
| 6,445,413 B1 | * | 9/2002 | Hosier et al. | 348/245 |
| 6,646,681 B1 | * | 11/2003 | Macy et al. | 348/241 |
| 6,774,941 B1 | * | 8/2004 | Boisvert et al. | 348/245 |
| 7,084,912 B2 | * | 8/2006 | Chieh | 348/245 |
| 7,427,735 B2 | * | 9/2008 | Eskerud | 348/241 |
| 2002/0101522 A1 | * | 8/2002 | Hosier et al. | 348/241 |
| 2005/0243193 A1 | * | 11/2005 | Gove et al. | 348/241 |
| 2006/0114342 A1 | * | 6/2006 | Egawa | 348/241 |
| 2006/0192864 A1 | * | 8/2006 | Mauritzson | 348/241 |
| 2007/0019085 A1 | * | 1/2007 | Suzuki | 348/241 |
| 2008/0012966 A1 | * | 1/2008 | Beck et al. | 348/245 |
| 2008/0054320 A1 | * | 3/2008 | Solhusvik et al. | 257/292 |

* cited by examiner

*Primary Examiner*—John M Villecco
(74) *Attorney, Agent, or Firm*—Lowe Hauptman Ham & Berner LLP

(57) ABSTRACT

A method for reducing the row noise from complementary metal oxide semiconductor (CMOS) image sensor by using average values from sub-regions of the shielded pixels. The method operates on sensor with and without a Color Filter Array (CFA) before any interpolation is applied and estimates the local offset by subtracting out outliers and averaging the averages of sub-regions in the shielded pixels. The method also reduces the pixel-to-pixel noise while reducing the row noise.

12 Claims, 4 Drawing Sheets

METHOD FOR REDUCING ROW NOISE WITH DARK PIXEL DATA

BACKGROUND

1. Field

This invention relates to the field of digital image processing, particularly the reduction of row noise in CMOS image sensors.

2. Related Art

Complementary Metal Oxide Semiconductor (CMOS) image sensors suffer from row noise that is usually due to the random noise that shifts the voltage level(s) in Analog-to-Digital Converter (ADC) and is a well know problem within the field of digital imaging. The shift in voltage level affects the ADC slope and ADC output by creating an offset consistent in the entire row of pixels. Row noise is seen as randomly distributed horizontal lines that appear to be relatively darker or lighter than the surrounding background. The noise becomes much more apparent to the eye due to the high correlation of pixels along the horizontal.

In U.S. Patent (U.S. Pat. No. 6,646,681 B1) Macy, this problem is attacked by a location specific row-by-row based offset correction mechanism. This method estimates the offset caused by random level shifts in the ADC converter by passing through the entire row and the several rows above and below to collect statistics as depicted in FIG. 1. After collecting statistics and estimating an appropriate offset, the mechanism attempts to correct for the row noise by adding the same offset to each pixel in the row. Although this method can be effective in certain scenarios, there are several drawbacks associated with reducing row noise on a local-statistics row-by-row basis.

Row noise reduction based on localized row-by-row correction is not effective in eliminating any vertical non-uniformity in sensor response. Such non-uniformities in sensor response can emerge when imaging evenly illuminated scenes, such as skies or photography studio backdrops and show up as shift in light and/or color variations from top to the bottom of the image. The local row noise will be corrected but it will be corrected to the underlying non-uniformity of the sensor response. Also, since the estimated offset is determined for an entire row at a time based on local active area statistics that may contain bad pixels, the possibility for visible image defects due to offset estimation error is increased. The estimation of the offset is susceptible to characteristics of other noise or defects present and the content of the scene being imaged. Any error will look noticeably worse because of the linear correlation of the corrected pixels and the human eyes tendency to impose linear patterns onto an image. For instance, if there happens to be a higher concentration of bad pixels within a certain number of rows, then the statistics will be skewed and the offset estimation will be erroneous. Such error, as affected by bad pixels, will be exaggerated because of the high linear correlation of the row noise correction offset. The method of the current invention provides for a much more robust and reliable estimation of the necessary offset.

In addition to its possibility of offset estimation error, the local active area row-by-row method of row-noise correction has several other significant drawbacks associated with a CMOS imager design, operation and image quality. Such localized row-noise reduction methods require that several rows of pixels be stored in memory during a statistical analysis step thus increasing the amount of physical memory required, the time spent processing the data and the cost to manufacture.

Since localized row-by-row methods passes all lines and pixels of a sensor as if they have uniform color response, it is inappropriate for use with CMOS sensors with Color Filter Arrays (CFA). CFAs, such as the so-called Bayer pattern, pass only one color at each pixel. Since most image sensors have a higher sensitivity to red light than to green or blue light, the response of a pixel with a red filter will be much higher than that of a pixel with a either a blue or green filter even if there is an equal level of red and blue/green signal. Due to this drawback, row-by-row noise correction can only be applied after an interpolation or demosaic step that can dramatically change the statistics required to estimate the offset.

Thus, there exists a need to improve the offset estimation step of row-by-row row-noise reduction methods to reduce the possibility of exaggerating row noise, the cost and complexity of sensor implantation and the visual appearance of vertical variations in sensor response.

SUMMARY

A method for reducing row noise in complementary-metal-oxide-semiconductor (CMOS) image sensors is disclosed. Row noise offset is determined on a robust row-by-row basis by collecting statistics within dark or shielded pixels in a row that reduces or eliminates the outlier effects of bad pixels. Here, bad pixels can be dead, hot or have an otherwise inconsistent response as compared to surrounding pixels. This methodology provides for several advantages over determining row noise offset on a localized active area row-by-row basis; reduction of required on chip memory, reduction of possible offset estimation error, application to sensors with color filter arrays prior to color interpolation and elimination of edge detection routines. The reduced requirement of on chip memory can lower the overall cost to produce the image sensor, while the reduced possibility of offset estimation error, application of noise reduction prior to color interpolation and the lack of smoothing or exaggeration of high frequency image content due to edge detection improves image quality.

DETAILED DESCRIPTION

The present invention provides a method for reducing row noise in complementary metal oxide semiconductor (CMOS) sensors. The method attempts to apply estimated offset levels, based on dark pixel statistics in a row, to the active area pixels in the same row on a row-by-row basis to eliminate random offsets that cause row noise. The present invention also removes the requirement of edge detection routines that can cause smoothing or exaggerating high frequency image content, which can cause edges in images to appear unnatural.

Figure 1:
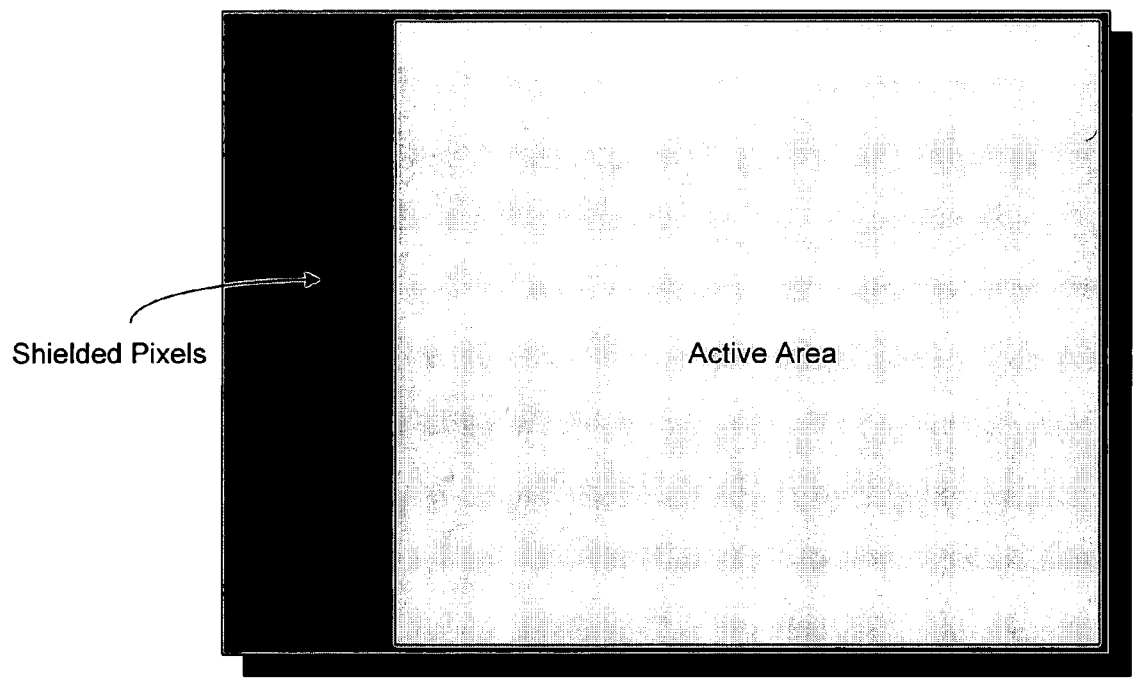
FIG. 1 is a block diagram of a typical CMOS image sensors with active area pixels and shielded pixels.
Figure 2:
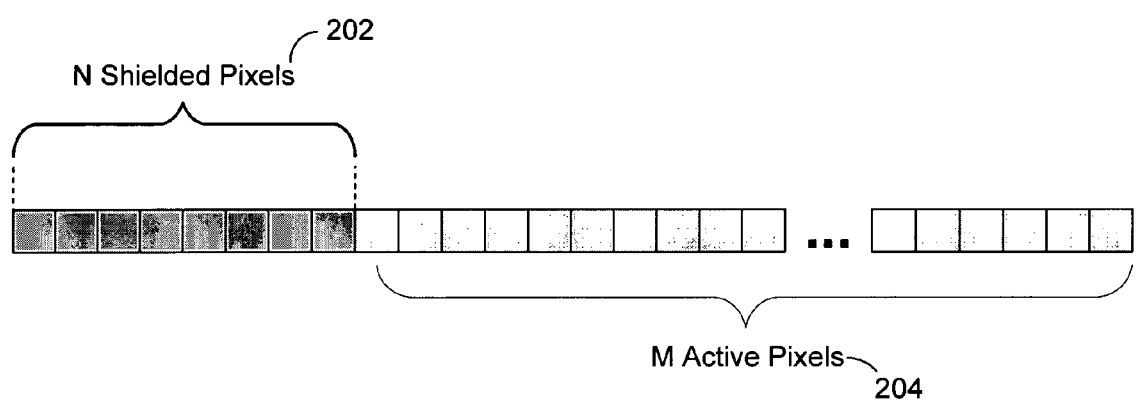
FIG. 2 is block diagram of a single row with active area pixels and shielded pixels according to one embodiment of the current invention.

FIG. 1 is a block diagram of a typical CMOS imaging sensor. There are two main regions on a CMOS imager chip; the active area that is exposed to light for image capture and the shielded area that is occluded by a layer of opaque material, typically a metal or poly layer. Each region is made up of many individual light sensitive picture elements or pixels. When an image of an object is projected onto the image sensor, it is the composite of light intensities collected at each mapped pixel location that is used to form a digital image. The active area, 204, and the shielded area, 202, pixels of a single row on a sensor are shown in FIG. 2. Since the shielded pixels, 204, are prevented from ever being exposed to light, their electrical performance characteristics while the sensor is operating are not as influenced as the active area pixels by possible nonlinearities caused by exposure to light. Although there is the possibility of leakage from active area pixels to shielded pixels along the border of the two regions that could possibly corrupt a clean reading of the dark state, the fact that the shielded area is usually many columns wide provides for a sufficiently large region of pixels completely uninfluenced by the exposure of the active area pixels. Therefore the shielded pixels make a good baseline from which to make estimates regarding necessary offsets to correct for row noise.

Generally the signal value of a pixel located at row i column j in the shielded region 202 can be expressed as:

$$P_{shielded}(i,j) = \text{Reference} + \text{Offset}(i) + \text{Noise}(i,j)$$

where is it assumed that the noise is approximated as additive and Reference is the desired constant signal value in the shielded region, usually zero or a number close to zero. With enough samples along the horizontal and with the correct statistical estimation methods, the horizontal component of the Noise can be eliminated. This leaves the $i^{th}$ row value in the shielded region as:

$$R(i) = \text{Reference} + \text{Offset}(i) + \text{Noise}(i)$$

Once R(i) is determined, the offset and vertical noise correction can be applied to the pixels in the active region of the sensor as:

$$P_{active} \text{Updated}(i,j) = P_{active}(i,j) - (R(i) - \text{Reference})$$

where $P_{active}(i,j)$ is the raw signal value, or intensity level, read at the pixel located at row i column j. The flow chart depicted in FIG. 3 shows the overall scheme just described.

Figure 3:
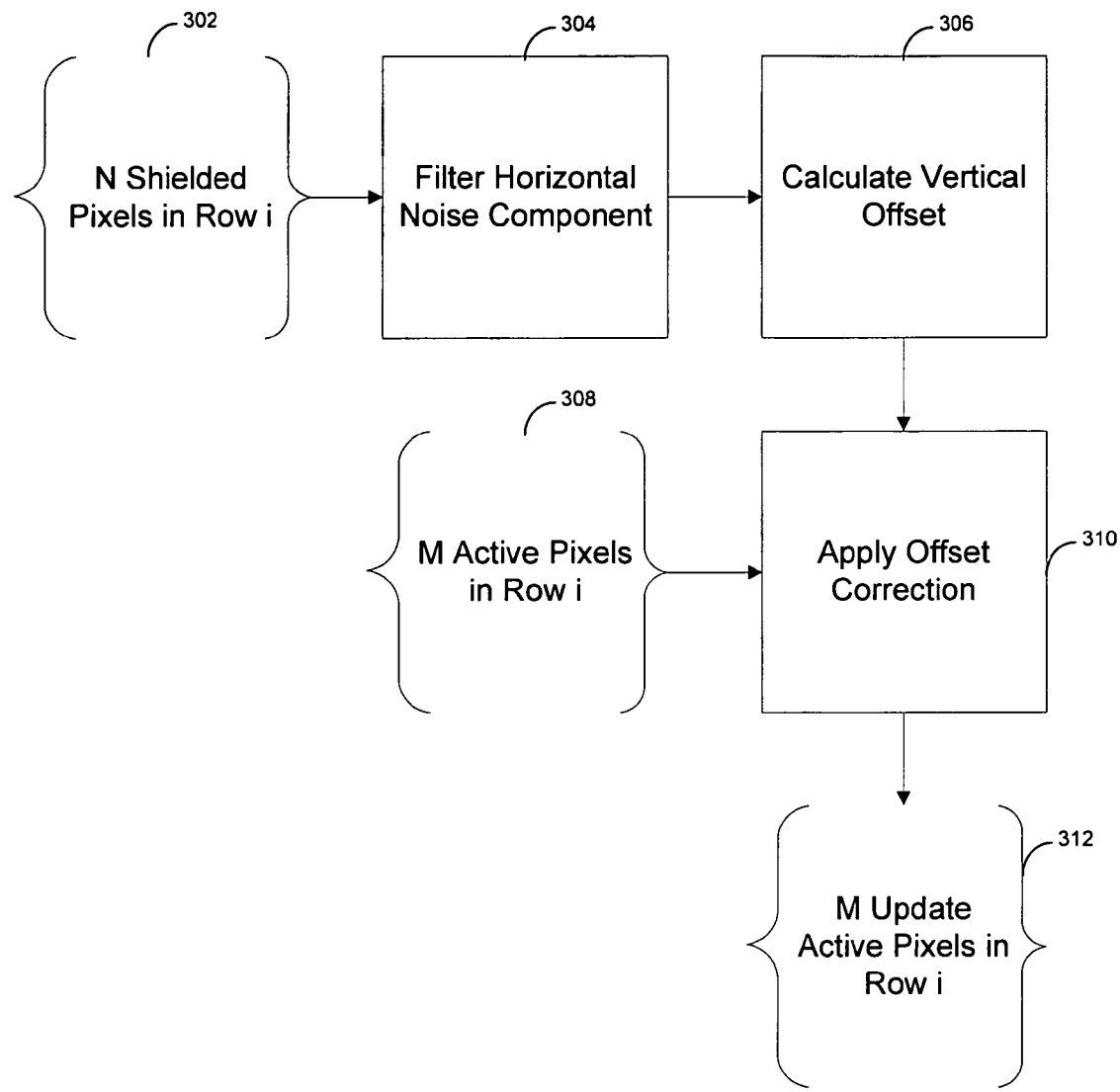
FIG. 3 is a flowchart according to one embodiment of the current invention.

FIG. 3 is a flow diagram illustrating a general approach for reducing row noise in a sensor N shielded pixels per row and M active pixels per row. First the digital or analog pixel intensity values are obtained in block 302 for the current row. Next, the horizontal noise component is filtered out in block 304. Depending on the particular type of noise present, there are many conceivable methods to filter out horizontal component of the noise. One a straightforward method to filter out horizontal noise is to average N shielded pixels for each row. Other filtering methods such as median, trimmed-mean and others can be used, however, the current invention is directed towards a method that is not only an effective way to remove the horizontal component of the noise, but also remove statistical outliers such as bad or wounded pixels before averaging. Once the horizontal component of the noise is filtered out in block 304, the vertical offset is calculated in block 306. The offset calculated in block 306 can then be applied to M active pixels in the current row, 308, in block 310 to generate the updated pixel intensity values, 312.

Figure 4:
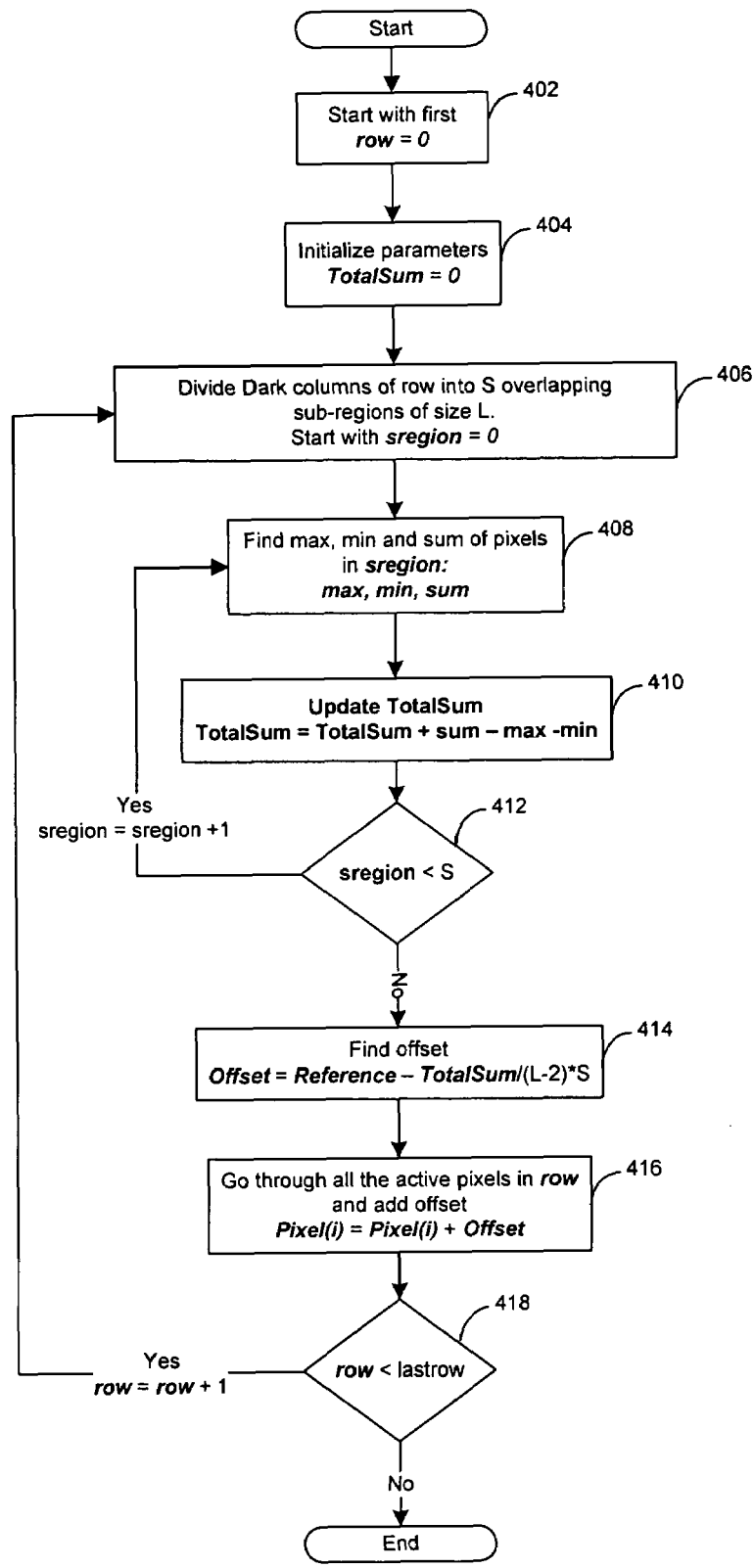
FIG. 4 is a flowchart according to one embodiment of the current invention.

FIG. 4 is a detailed flow diagram illustrating the preferred method for removing random offsets in an image on a pixel-by-pixel basis using the intensity values from the shielded pixels on a sensor. This method can be used on a sensor of any size for as many rows of such a sensor that have shielded and active area pixels. In block 402 the parameter row is initialized to row=0 to start, with the first row; moving from either the top row of the sensor to the bottom row or from the bottom row to the top row of the sensor. In block 404 the parameter TotalSum, which will be used to store the sum of all sub-regions less the values of the outliers. In the preferred embodiment of the current invention, in block 406 the shielded pixels in row row are divided into S overlapping sub-regions of size L. Ideally, length L is chosen so as to be easily handled by electronics logic components so that the data processing is carried out as quickly as possible. Advantageous lengths of L are 4, 8 and other values of $2^x$ pixels, however, any length of sub-region can be used without departing from the spirit of the current invention Optionally, in another embodiment of the current invention, the S sub-regions are not overlapping. In each sub-region the maximum and minimum intensity values are subtracted and the average of the remaining pixels is calculated.

Starting with sregion=0, the maximum, max, the minimum, min, and the sum, sum are Calculated in block 408. In block 410, the parameter TotalSum is updated to:

$$\text{TotalSum} = \text{TotalSum} + \text{sum} - \text{max} - \text{min}.$$

TotalSum now represents the sum of the intensity values for all shielded pixels in the current sub-region plus the TotalSum for any previous sub-regions, minus the intensity values of any damaged pixels that might be present in the form of dark/dead pixels or bright/hot pixels.

In block 412, sregion is compared to S, the number of sub-regions. If sregion is greater than S, which would indicate the last of the sub-regions had been processed, then the operation continues with block 414. Otherwise the operation continues on with block 408 and by adding one to sregion.

In block 414, Offset is calculated as:

$$\text{Offset} = \text{Reference} - \text{TotalSum}/(L-2)*S$$

where the average of the shielded pixels is subtracted from a predetermined Reference. Reference is the desired constant signal value in the shielded region of the sensor. In block 416, the calculated Offset is added to each active pixel in the current row. In block 418, row is compared to the number of rows on the sensor. If row is greater than the number of rows on the sensor to be filtered, then all the rows of the sensor have been processed and the operation terminates. Otherwise, the operation adds one to row and continues on with block 406.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method for reducing row noise in an image sensor having a shielded region and an active region, comprising:
   dividing pixels in the shielded region into S overlapping sub-regions of length L along a row;
   collecting statistics of signal values of said S sub-regions;
   determining offset based on said statistics; and
   updating signal values of up to all of the pixels of the active region in said row by adding the offset to the signal values of said pixels of the active region.

2. A method for reducing row noise in an image sensor having a shielded region and an active region, comprising:
  dividing pixels in the shielded region into S sub-regions of length L along a row;
  determining the maximum, the minimum, and the sum of the signal values of each of said S sub-regions;
  subtracting the maximum and the minimum from the sum before calculating the average signal values of each of said S sub-regions;
  calculating the average of the S sub-region averages;
  determining offset based on said average of the S sub-region averages; and,
  updating signal values of up to all of the pixels of the active region in said row by adding the offset to the signal values of said pixels of the active region.

3. The method of claim 2 wherein the determining the offset step further comprises;
  calculating offset for a row as the difference between a predetermined reference value and the average of the S sub-region averages.

4. The method of claim 3 wherein said predetermined reference value is zero.

5. The method of claims 2, 3 or 4 wherein said S sub-regions overlap.

6. The method of claims 2, 3 or 4 wherein said S sub-regions are mutually exclusive.

7. A method for reducing row noise in an image sensors having a shielded region and an active region, comprising:
  dividing pixels in the shielded region into S sub-regions of length L along a row, each of S and L being an integer larger than 1;
  collecting statistics of signal values of said S sub-regions;
  determining offset based. on said statistics; and,
  updating signal values of up to all of the pixels of the active region in said row by adding the offset to the signal values of said pixels of the active region.

8. The method of claim 7, wherein said collecting step further comprises:
  determining the maximum, the minimum, and the sum of the signal values of each of said S sub-regions;
  subtracting the maximum and the minimum from the sum before calculating the average signal values of each of said S sub-regions; and
  calculating an average of S sub-region averages.

9. The method of claim 7, wherein the determining offset step further comprises:
  calculating offset for a row as the difference between a predetermined reference value and an average of S sub-region averages.

10. The method of claim 9, wherein said predetermined reference value is zero.

11. The method of claim 7, wherein said S sub-regions overlap.

12. The method of claim 7, wherein said S sub-regions are mutually exclusive.

* * * * *